Oct. 16, 1934.  W. P. SHOMAKER  1,976,892
STRAIGHT LINE FEEDING MECHANISM
Filed Aug. 14, 1931  6 Sheets-Sheet 1

Inventor
Wesley P. Shomaker
By Mawhinney & Mawhinney,
Attorneys

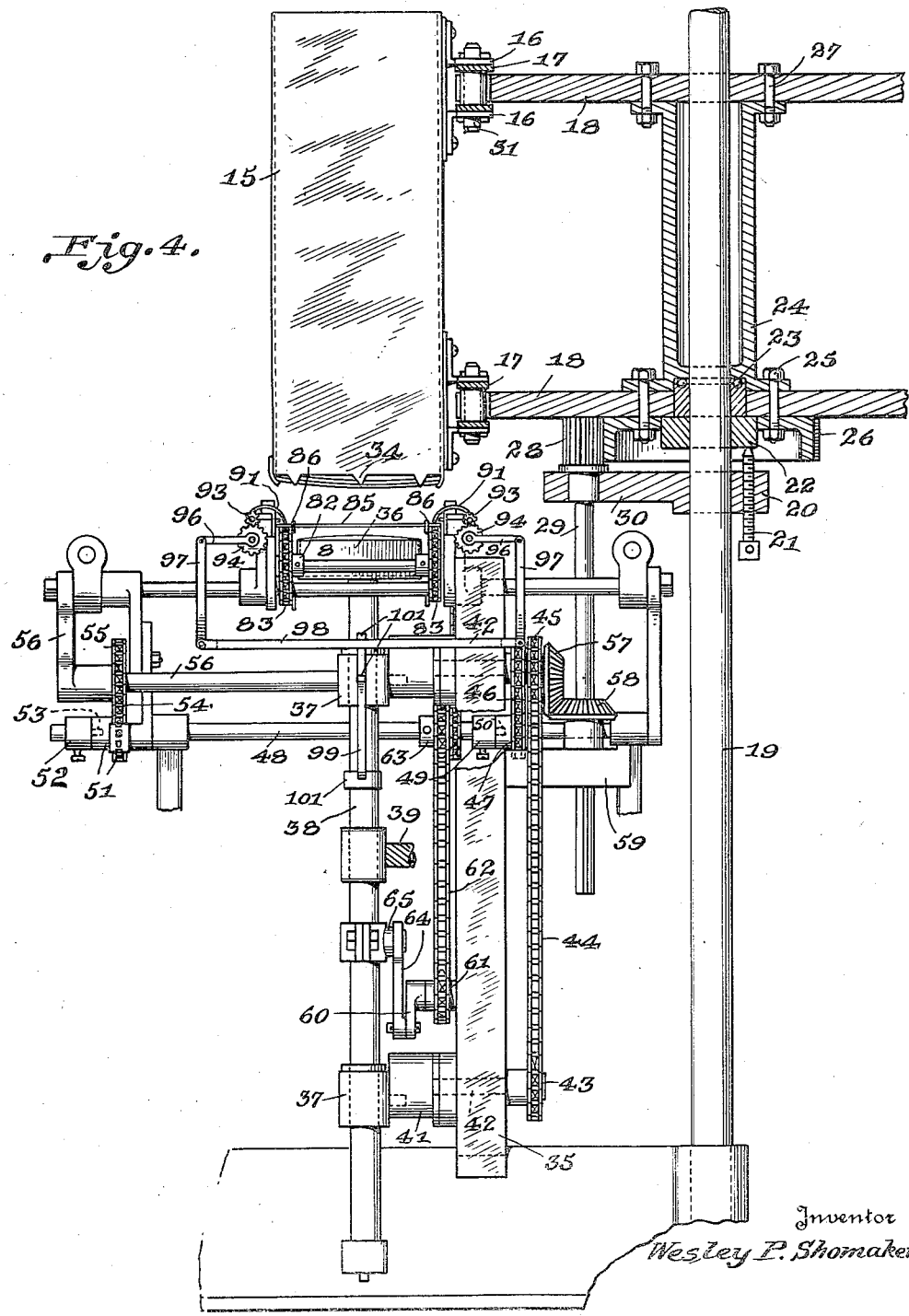

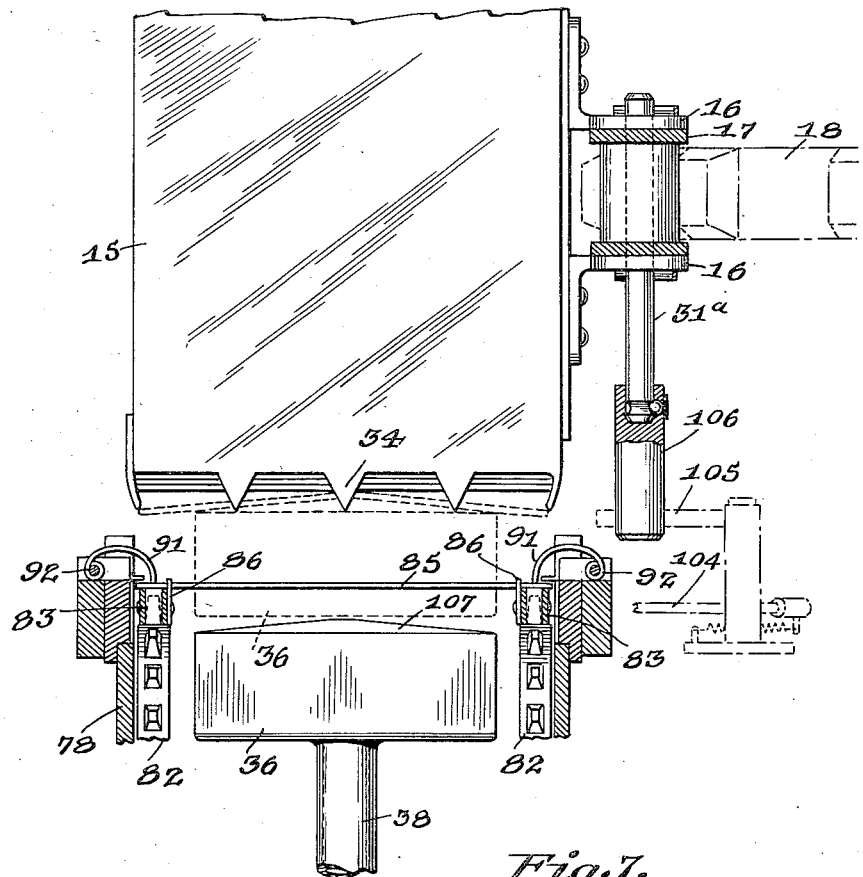

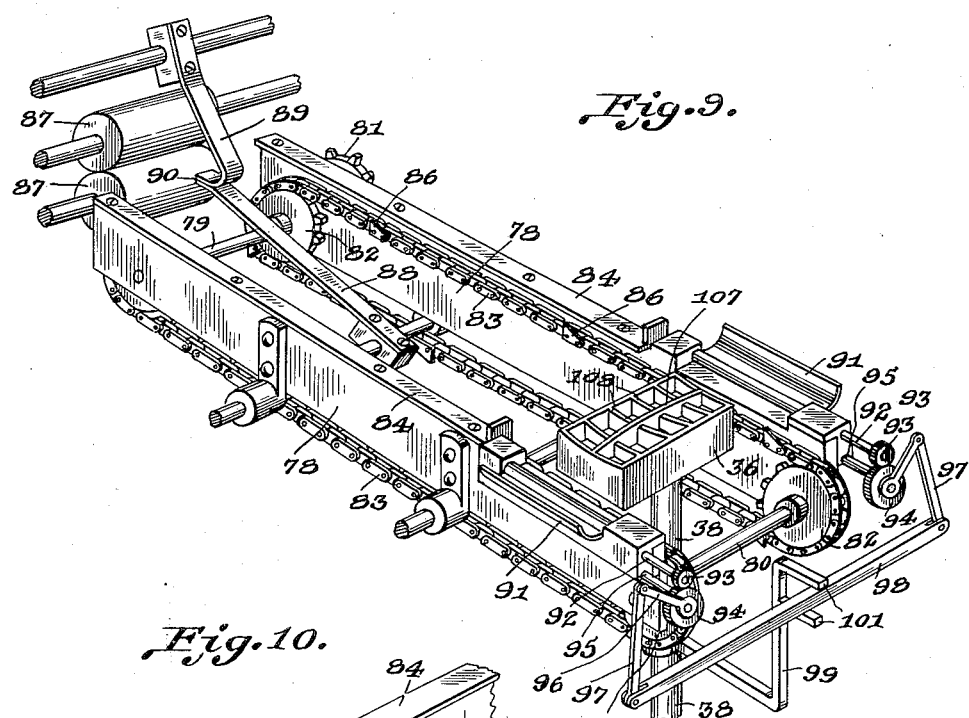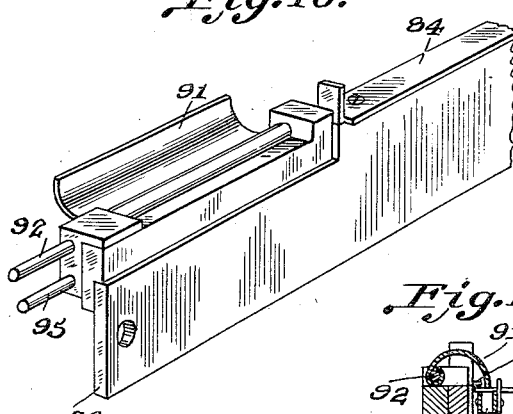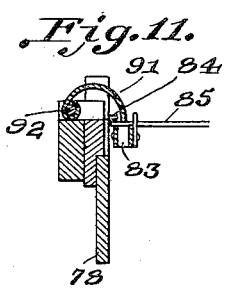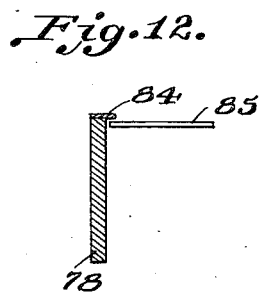

Patented Oct. 16, 1934

1,976,892

UNITED STATES PATENT OFFICE 1,976,892

STRAIGHT LINE FEEDING MECHANISM

Wesley P. Shomaker, Richmond, Va.

Application August 14, 1931, Serial No. 557,165

17 Claims. (Cl. 271—32)

The present invention relates to feeding mechanism provided particularly for use in connection with envelopes for feeding the same one at a time in desired consecutive order into a printing press or other mechanism so that the envelopes may be individually printed, numbered, or otherwise operated upon.

An object of the present invention is to provide an improved feeding means for taking envelopes consecutively from an endless row of magazines and carrying the envelopes in a straight line from one of the straight runs of the magazines and passing the envelopes consecutively to a printing mechanism, or the like, without requiring any axial adjustment or turning of the envelopes after they leave the magazines.

A further object of the present invention is to provide operating means for the endless row of magazines, and cooperating feeding means relative thereto which are adjustable in that the magazines may be continuously operated during the taking-off consecutively of the individual envelopes, or the magazines may be mounted stationary without movement and the envelopes may be withdrawn one at a time from any one magazine.

The invention also aims at the provision of certain improved constructions of feeding mechanism embodying a sucker or picker head for individually withdrawing the envelopes one at a time from the magazines consecutively as they are brought up into register with the feeding mechanism and for depositing the envelopes upon a straight line of feed leading from the magazines to a printing or other mechanism.

The invention further provides, in connection with the sucker or picker head, eccentric means for swinging the head laterally in line with the movement of the magazines, and also provides the sucker or picker head with a crank mechanism which has a greater throw than that of the eccentric and arranged for moving the sucker or picker head toward and from the magazines without interference with the eccentric movement, and which may be coordinated with the eccentric movement to effect the desired taking-off of the envelopes from consecutive magazines, or which may be operated independently of the eccentric movement for taking-off the envelopes consecutively from the same magazine; the eccentric means providing bearings for the longitudinal operation of the sucker or picker head during either the combined movements of the eccentric and crank mechanism or when the crank mechanism alone is operated.

With the foregoing and other objects in view, the invention will be more fully described hereinafter, and will be more particularly pointed out in the claims appended hereto.

In the drawings, wherein like symbols refer to like or corresponding parts throughout the several views.

Figure 4 is an enlarged fragmentary transverse section taken through the machine substantially on the line 4—4 of Figure 1 and showing the straight line feeder.

Figure 5 is a fragmentary enlarged sectional view taken through the straight line feeder and through adjacent portions of the magazine support and trip finger.

Figure 6 is a detail prospective view of one form of sucker head which may be used.

Figure 7 is a detail enlarged top plan view of a section of one of the magazine chains, showing the spring clip retainer for releasably holding the chain links together.

Figure 8 is a detail fragmentary prospective view of one of the straight line feeder chains with the envelope carrying projection thereon.

Figure 9 is a detail prospective view of the straight line feeder, showing the envelope holders in open position and the sucker head raised for withdrawing an envelope from one of the magazines.

Figure 10 is a fragmentary enlarged prospective view of one side of the straight line feeder, showing one of the envelope holders and its mounting.

Figure 11 is a transverse section through the same, showing the envelope holder in closed position and engaging an envelope, and Figure 12 is a transverse section taken through one side of the straight line feeder, showing the retaining flange beyond the envelope holder and an envelope in position beneath the flange.

Figure 1:
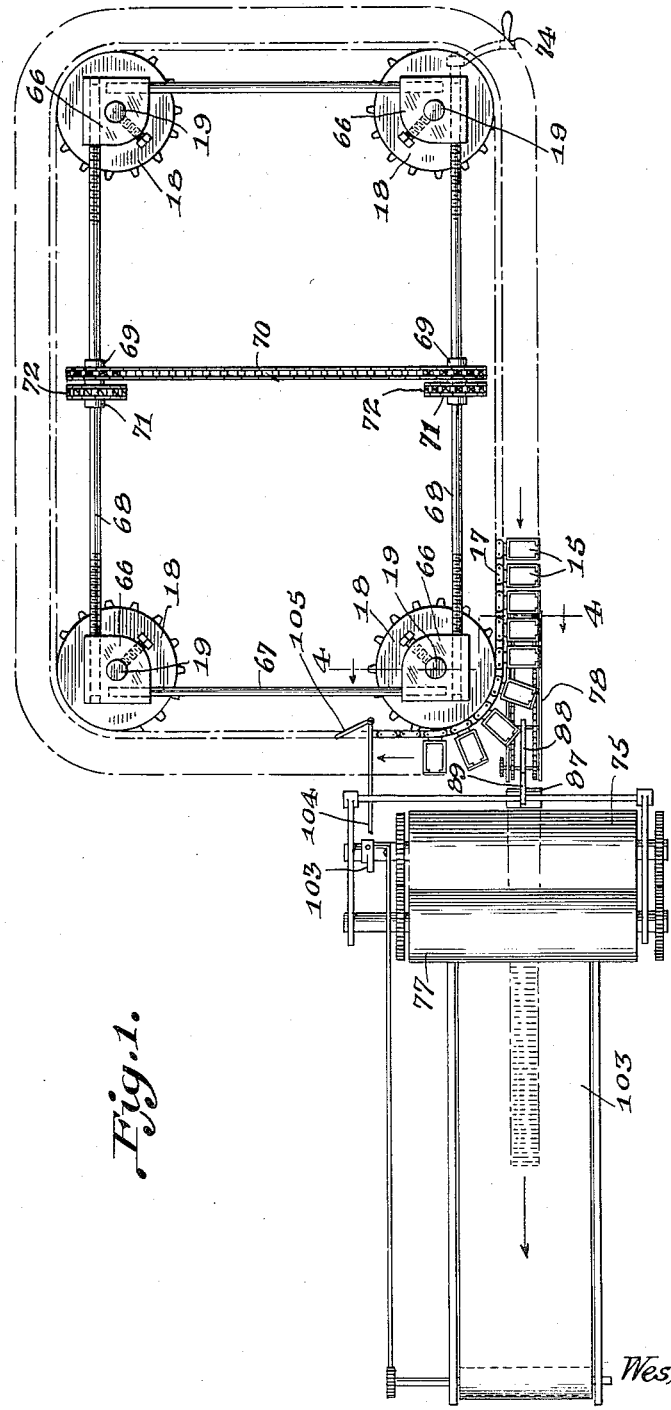
Figure 1 is a plan view, partly diagrammatic, of a straight line feeding mechanism embodying features of the present invention.

Referring now to the drawings the mechanism of this magazine is shown as applied to a magazine carrier wherein the magazines 15 each comprise a vertically elongated or relatively deep box or compartment shaped to the configuration and dimensions of a stack of envelopes adapted to be carried therein. The magazines 15 are arranged in an endless row with their sides or lateral portions in opposed or adjacent relation so that the longitudinal axes of the magazines 15 are arranged substantially in parallel relation and are substantially radial to the supporting endless chains or belts employed. Each magazine 15 is provided at its inner end, and at points adjacent its top and bottom with vertically registering pairs of ears 16 with the ears of each pair spaced apart to receive therebetween adjacent chain links 17 and forming therewith portions of two endless chains, one supporting the upper portions of the magazines while the other chain supports the lower portions thereof. These chains are mounted upon horizontal sprocket wheels 18 which are arranged in any suitable order, such as in rectangular order as shown in Figure 1, and the sprocket wheels are arranged in an upper group for the upper chain and in a lower group for the lower chain. Posts 19 are arranged at the corners of the magazine carrying structure about which the sprockets 18 are disposed and any suitable means may be provided for supporting the sprocket wheels at the desired elevations to accommodate the heights of the magazines 15.

As shown to advantage in Figure 4, one means of supporting the sprocket wheels 18 is disclosed. An adjustable collar 20 is fixed at the desired height upon the post beneath the lower sprocket wheel 18 of each pair and is provided with an adjusting screw 21 threaded upwardly through the collar 20 and engaging at its upper end against a slidable block 22 which supports the double sprocket wheel structure. The block 22 has a reduced portion providing an annular race for bearings 23, and the race portion of the block extends axially upward through the lower sprocket wheel 18 and the sprocket wheel is adapted to turn about the block 22 and is supported by a sleeve 24 surrounding the post 22 between the sprockets 18 and which bears at its lower end upon the bearings 23. The lower end of the sleeve 24 is flanged to support bolts 25 which clamp the sleeve to the sprocket wheel 18, and which also clamp a gear wheel 26 against the under side of the lower sprocket wheel 18. This gear wheel 26 is located at one corner only of the structure, such corner being preferably adjacent to the position of take-off of the envelopes so that the sprocket wheels at this corner may be driven by the mechanism of the machine. The upper end of the sleeve 24 is also flanged and is secured by bolts 27 to the upper sprocket wheel 18 so that the two sprocket wheels will move as a unit. The gear wheel 26 meshes with a pinion 28 carried upon a vertical shaft 29 which has bearing through an arm 30 carried upon the collar 20 at said corner of the magazine structure so that the gear wheel 27 may be turned by the pinion 28 when the shaft 29 is rotated.

The ears or lugs 16 which are mounted on the inner end of the magazines 15, comprise links in the upper and lower chains and are apertured in register at opposite ends to receive therethrough pivot pins 31, as shown particularly in Figure 7, for pivotally connecting to the opposite ends of the ears 16 the links 17 for coupling together the various magazines 15 in endless formation. The pivot pins 31 are removably held in position through the adjacent ends of the lugs 16 and links 17 by U-shape retainers 32 which are preferably formed each of a length of wire bent substantially at right angles at its opposite ends for insertion through openings provided in the ends of the pivot pins 31. A clip 32 is provided for each lug 16 and is adapted to engage across the lug for engaging the adjacent pins 31. Spring clips 33 having relatively straight shank portions and inwardly curved opposite ends, are engaged over the clips 32 and with the inwardly curved opposite ends engaged about the pins 31. The curved opposite ends of the spring clips 33 are of such length as to extend beyond the aligning diametrical portions of the pins 31 so as to yieldingly hold the spring clips 33 in place against the clips 32 and thus retain the latter from accidental displacement. The clips 33 may be swung from the pins 31 so that the clips 32 may then be slid out of engagement with the pins 31 when it is desired to disengage the chain for removing or inserting magazines with respect thereto.

The lower ends of the magazines 15 are open and are provided with a suitable number of inwardly directed fingers 34 adapted to retain a stack of envelopes in the magazines and to admit of the withdrawing of the envelopes one at a time through the bottom of the magazines.

The frame 35 of the machine may be of any suitable construction and configuration to adapt it for supporting the various parts of the machine, and is disposed with its major portion beneath one of the straight line runs of the magazines 15, and near the end of the run so as to withdraw the envelopes from the magazines just prior to the carrying of the magazines laterally or around one of the adjacent corners of the magazine supporting structure. The frame 35 carries a suction or picker head 36 which is slidably mounted in bearing blocks 37 by means of a hollow shank 38 extending downwardly from the picker head 36 to admit of the vertical movement of the shank 38 in the blocks 37. The hollow shank 38 is connected by a flexible hose 39 to a suitable source of suction through a valve mechanism 40 of any suitable or well know type. The blocks 37 are pivotally mounted upon eccentrics 41, best shown in Figure 4, which are carried upon shafts 42 extending through the adjacent portion of the frame 35 and which are provided with sprocket wheels 43 upon their opposite ends interconnected by a sprocket chain 44 adapted to turn the eccentrics 41 simultaneously and equally to reciprocate the sucker head 36 in the lengthwise direction of the feed of the magazines 15. One convenient way of operating the eccentrics 41 is by means of a sprocket wheel 45 fixed upon the upper eccentric shaft 42 and over which passes a chain 46 extending forwardly within the machine and passing over a sprocket wheel 47 mounted to freely turn on a transverse shaft 48 and which is selectively locked thereto by means of a sleeve 49 having a side screw for securing the sleeve to the shaft 48 and having one or more locking or clutch pins 50 which engage in corresponding sockets or depressions in the hub of the sprocket wheel 47. Thus, at times the sprocket wheel 47 may be released from the shaft 48 so as to maintain the bearing blocks 37 at rest.

On the outer end of the shaft 48 is freely mounted a sprocket wheel 51, and adjacent thereto is a sleeve or collar 52 having a set screw for locking it on the shaft 48 when adjusted toward and from the sprocket wheel 51. The collar or sleeve 52 carries one or more clutch pins 53 for interlocking engagement with the sprocket wheel 51 to secure it to the shaft 48 at times. A chain 54 passes over the sprocket wheel 51 and extends rearwardly and upwardly to a sprocket wheel 55 mounted on a transverse shaft 56 which at its inner end carries a beveled gear wheel 57 which meshes with a second beveled gear wheel 58 splined upon the shaft 29. The gear wheel 58 rests upon a bracket or support 59 which is carried by the frame 35, thus, when it is desired to arrest the feeding of the magazines, the clutch collar 52 may be released from the sprocket wheel 51, and when it is desired to release the operation of the eccentrics the clutch collar 49 is in a similar manner released from the sprocket wheel 47. In order to impart a desired vertical reciprocation of the sucker or picker head 36 through the eccentrics or bearing blocks 37, the same is accomplished by means of a crank 60 which is mounted upon the lower portion of the frame 35 and provided with a sprocket wheel 61 over which passes a chain 62, and the latter is carried forwardly and upwardly to a sprocket wheel 63 which is secured upon the shaft 48 as clearly shown in Figure 4. The crank arm 60 is connected by a rod 64 to a pin 65 having a sleeve which is clamped at the desired height upon the shank 38 of the sucker head so that operation of the crank arm 60 moves the sucker head through the bearing blocks 37.

The shafts 48 and 56 are suitably supported upon arms or brackets which comprise part of the main frame 35.

Figure 2:
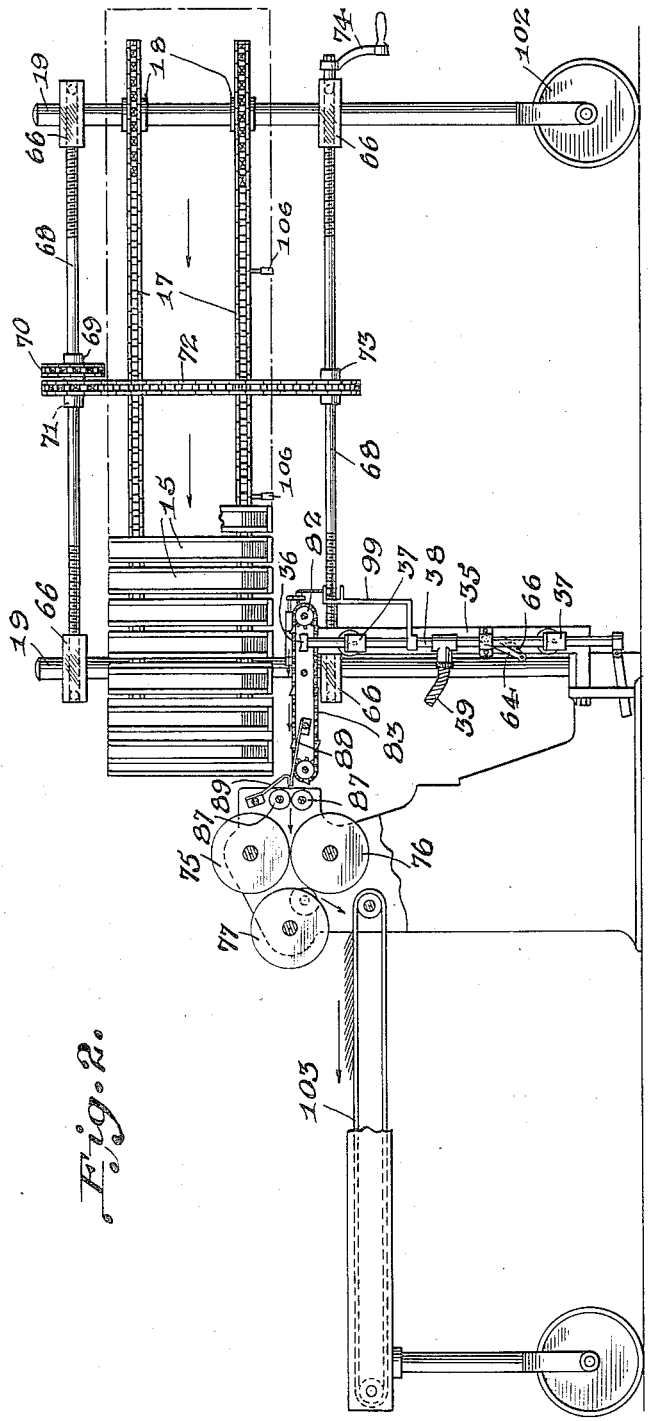
Figure 2 is a side elevation of the same.
Figure 3:
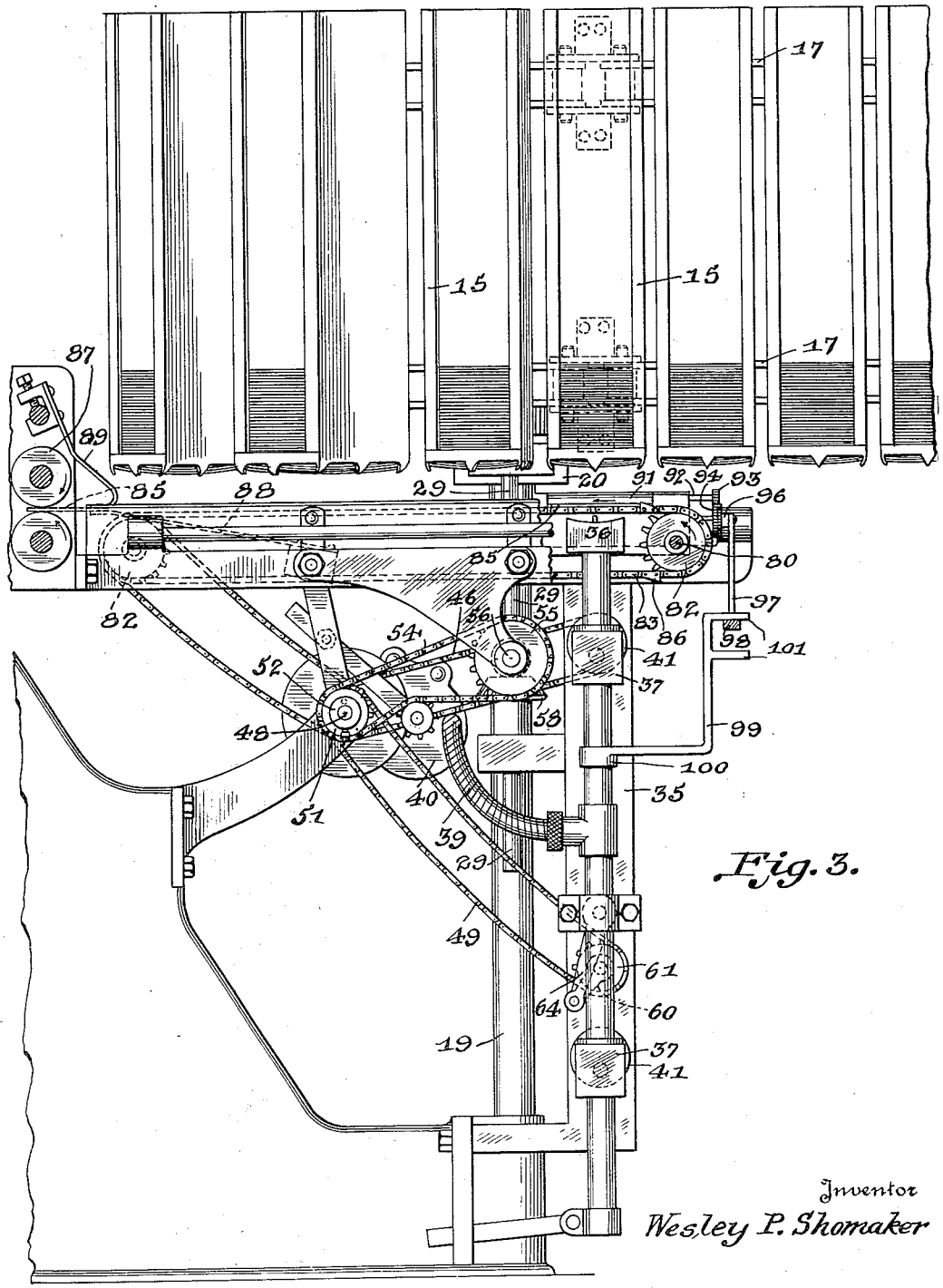
Figure 3 is a fragmentary enlarged side elevation of the machine, showing the straight line feeder in position beneath the magazines, and the adjacent envelope transfer mechanism.

As shown particularly in Figures 1 and 2, the magazine feed mechanism is adjustable so as to maintain the endless row or magazines 15 at the desired tension over the sprocket wheels 18 when the endless chain of magazines is enlarged or reduced. To accomplish this adjustable means is provided for moving the ends of the magazine carrier toward and from each other so as to reduce or increase the space or length of travel of the endless chains. The posts 19 are each provided with a pair of corner blocks 66 one arranged above the adjacent pair of sprocket wheels 18, and the other block being disposed below the pair of sprocket wheels. Each pair of corner blocks is provided with inwardly registering socket openings adapted to receive therein spacing rods 67 to hold the end corner blocks in the desired spaced apart relation. Each corner block 66 is provided with a threaded opening therethrough disposed at right angles to its socket opening for receiving the adjacent threaded end of adjusting rods 28 which extend lengthwise in the magazine supporting frame not only at opposite sides thereof but also in register with the upper and lower series of corner blocks. Each rod 68 is oppositely threaded on opposite ends so that when all of the rods 68 are turned in one direction the corner blocks 66 will be forced apart lengthwise of the frame, and when the rods 68 are turned in opposite directions the corner blocks at the ends of the frame will be drawn toward each other or contracted.

The upper rods 68 carry sprocket wheels 69 connected together by a chain 70. The upper rods 68 are also each provided with a second sprocket wheel 71 over which travels a sprocket chain 72, and the sprocket chain 72 extends downwardly at opposite sides of the magazine frame and pass over the sprocket wheels 73 which are mounted upon the lower rods 68. One of the rods 68, such as the lower inner rod, as shown in Figures 1 and 2, is provided with an extension on which is mounted a crank handle 74 adapted to be turned by hand for turning all of the rods 68 simultaneously and equally through the chains 70 and 72. Of course this construction is modified or changed to suit conditions of the general shape of the endless chain of magazines as the same may be given various other configurations in plan.

The magazine frame is so disposed as to longitudinally align one run or side of the endless row or magazines with the longitudinal axis of a printing or other suitable mechanism adapted for operation upon the envelopes. In the present instance, a printing and numbering arrangement is shown in Figures 1 and 2. A group of rollers is employed, the upper one of which is a printing roller 75 which cooperates with a lower impression roller 76, and in rear of the printing and impression rollers is disposed a numbering roller 77. The longitudinal axes of these rollers is disposed at right angles to the longitudinal axis of travel of the line of magazines adapted to be advanced toward the printing couple. The magazines 15 are so disposed that as they advance toward the printing couple the longitudinal axes of the magazines will be substantially parallel with the axes of the rollers with the result that the envelopes which are withdrawn from the magazines are in correct position without being turned or swung into a new position, to be advanced directly into the printing couple.

A straight line feeding means is employed for receiving the envelopes one at a time from the sucker head 36 and carrying the envelopes successively into the printing and numbering mechanism.

This straight line feeding mechanism comprises a pair of frame plates 78 disposed in an edgewise vertical position and suitably spaced apart at the opposite sides of the sucker head 36. A shaft 79 is arranged between the plates 78 at one end of the latter while a second shaft 80 is disposed between the opposite ends of the frame plates 78. The shafts 79 and 80 have bearing in the plates, and the shaft 79 may extend at one end through the adjacent plate and carry a drive sprocket 81 for receiving a drive chain, or the like, by means of which the straight line feeder is operated. The shafts 79 and 80 are each provided with a pair of spaced apart sprocket wheels 82, and the sprocket wheels are preferably disposed adjacent to the inner opposite faces of the frame plates 78. The corresponding side sprockets at opposite ends of the feeder frame are in alignment with each other and each pair of aligned sprockets 82 carries an endless chain 83 so disposed that the upper runs of the chains 83, as shown in Figure 11, lie closely adjacent to the upper edge portions of the frame plates 78. The frame plates 78 are provided with retaining flanges or strips 84 which are secured upon the plates 78 and project inwardly from the upper edges thereof to overhang, at least in part, the chains 83. The flanges 84 are spaced slightly above the chains so as to provide a passage for the reception of the opposite ends of the envelopes 85 which are adapted to lie across the chains and to be held thereon by the flanges 84.

The chains 83 are provided upon their inner opposite sides with suitably spaced apart pairs of registering abutments or fingers 86 which are shouldered and disposed with the shoulders facing the printing couple, the fingers 86 lying beyond the inner edges of the flanges 84 and preferably extending above the plane of the flanges to securely hold the envelopes upon the chains 83 and to prevent the envelopes from rising out of engagement with the fingers 86. The feeder frame extends into position adjacent the printing mechanism and the upper portion of the frame, or the run-way for the envelopes is preferably in register with the line of feed between a pair of feed rollers 87 so that envelopes passing outwardly on the feeder are fed directly into the feed rollers. These rollers 87, as is usual, are driven at a relatively high speed so that when the rollers engage an envelope they draw the same from the feeder and from in front of the fingers 86. In order to properly direct the envelopes into the feeding rollers, the feeder frame carries a lower spring finger 88 which extends outwardly and upwardly so as to engage the under side of the flanges and support them in line with the rollers. An upper spring finger 89 is mounted upon the printing mechanism, extends downwardly and rearwardly and is returned upon itself to provide a lip 90 which yieldingly engages the outer end of the finger 88 so as to yieldingly press against the opposite sides of the envelopes as the latter move rearwardly. These fingers 88 and 89 are adapted to move the forward edge of the envelope in the proper position for engagement between the rollers 87.

The sucker head 36 operates vertically between the rear end portions of the frame plates 78, or operates vertically through the rear end of the straight line feeder. When the sucker head 36 engages against the bottom of a magazine 15, and is drawn downwardly therefrom with the lowermost envelope, the envelope is moved down to engage at opposite ends across the upper sides of the chains 83 as shown to advantage in Figure 5. In order to hold the envelope in this position on the chains 83 while the sucker head 36 continues its downward movement to free the sucker head from the envelope 85, means is provided for holding the envelope firmly on the chains. The inner end portion of the feed frame is thus provided with a pair of envelope holders 91 which are in the form of relatively wide curved jaws rolled over at their outer edge portions to provide eyes through which are fixed shafts 92 having pivotal mounting in the upper portions of the frame plates 78, and which project rearwardly from the plates. The shafts 92 each have a pinion 93 upon its rear end which meshes with an adjacent gear wheel 94, and the gear wheel 94 is mounted upon a supporting shaft 95 which projects rearwardly from the adjacent frame plates 78 and which has an outwardly extending arm 96. The arms 96 each have a link 97 which extends downwardly, and the links 97 are pivotally connected at their lower ends upon a cross bar or tie-rod 98. The arms 96 and the gear wheels 97 are so relatively disposed with respect to the envelope holders 91 that the envelope holders are in open or outwardly swung position, as shown in Figure 9, when the arms 96 are raised. When the bar 98 is depressed, the arms 96 swing down and close the holders 91, as shown in Figure 5.

Various means may be employed for operating the envelope holders 91. One means, however, may comprise a shifting fork 99 which may be in the form of a bracket having a collar 100 fixed in any suitable manner upon the shank 38 of the sucker head so as to raise and lower the fork or bracket 99 with the sucker head. The bracket 99 is offset rearwardly from the sucker head and extends upwardly and is provided with a pair of striker fingers 101 which are spaced apart a predetermined distance so as to raise and lower the cross bar 98 intermittently and at certain predetermined times during the rise and fall of the sucker head 36. The arms 101 strike the upper and lower faces of the cross bar 98 alternately and with a suitable interval of time between operations to admit of the reception of the envelope beneath the holders 91 and the time interval required for the forward feeding of the envelope which is held beneath the holders 91.

As the forward end of the magazine frame is arranged in a relatively fixed position with respect to the straight line feeder and the suction head, adjustment of the magazine frame is effected by movement of the rear end thereof only by advancing the rear end forwardly, or moving the rear end further back to accommodate the length of the endless magazine structure. Therefore, the rear posts 19 may be provided with rollers or wheels 102 to facilitate this adjustment when the handle 74 and the threaded rods 68 are turned.

The outer end of the machine is provided with a conveyor belt 103, or any other suitable device adapted to receive the envelopes after they have passed from between the rollers 75 and 76 and also passed the numbering roller 77.

In operation, envelopes of the desired character are disposed in independent stacks in the magazines 15. When it is desired to take-off a single envelope from each consecutive stack or magazine 15, all of the mechanism of the machine is set in operation. The magazine carrier is continuously operated through the gear wheel 26, pinion 28, shaft 29, bevel gear wheels 58 and 57, and the shaft 56. The shaft 56 is driven by the chains 54 from the shaft 48 when the clutch collar 52 is interlocked with the sprocket wheel 51. At the same time, the shaft 48 through the chain 56 operates the eccentric blocks 37 so that the shank 38 is given a forward and reverse movement beneath the line of magazines 15, and the speed of this movement is preferably comparable to that of the speed of travel of the magazines. During this time, the sucker head 36 with its shank 38 is also given a vertical movement by the crank arm 60 which is connected to the shaft 48 by the chain 62. The operation of the crank arm 60 is so timed with respect to the eccentric movement of the blocks 37, that the shank 38 is raised to engage the head 36 against the bottom of an adjacent magazine 15 during the forward movement of the blocks 37. Thus, the sucker head 36 is held in relatively fixed contact against the bottom envelope to give sufficient time for the suction head 36 to firmly grasp the envelope. The crank arm 60 now pulls the sucker head with its envelope downwardly through the rear end of the frame of the feeder, and the envelope is brought at opposite ends across the upper sides of the chains 83. During the upward movement of the sucker head 36, the bracket 99 engages the cross rod 98 and swings the envelope holders 91 into open position so that the envelope when drawn downwardly will have a free and uninterrupted path about the upper faces of the chains 83. As soon, however, as the sucker head 36 is about to leave the envelope, the upper finger 101 of the fork 99 engages the top of the cross bar 98 and draws the same downwardly with the result that the holders 91 are swung over into position upon the upper face of the envelope 85 so that the envelope is held from being drawn downwardly from the chains 83. The sucker head 36 may now move down to its fullest extent, and the fingers 101 are so spaced as to permit of this movement. During this time the feeder chains 83 are continuously driven with their upper runs moving outwardly or forwardly toward the printing mechanism. Thus, as soon as the envelope 85 is released from the sucker head 36, the next adjacent pair of fingers 86 are brought against the rear edge of the envelope 85 with the result that the envelope is carried with the chains 83 outwardly of the feeder and in a straight line with respect to the line of magazines 15 and to the line of feed into the printing mechanism. It will be noted that the envelopes 85 when they are drawn out of the magazine 15 are held from axial turning and are maintained in their same relative position throughout the entire feeding operation as they were supported in the stack in the magazine. The chains 83 carry the envelope 85 rearwardly and the lower finger 88 takes up the forward edge of the envelope and directs it into position between the lip 90 and the free end of the finger 88. The fingers 88 and 89 therefore direct the forward edge of the envelope into the feed rollers 87 and the quick action of the latter draws the envelope out of the straight line feeder so as to escape the fingers 86, and deliver the envelope to the printing and impression rollers 75 and 76.

At times it is desirable to maintain the magazines 15 stationary and to take the envelopes out of the same consecutively from one magazine. To do this the clutch elements or collars 49 and 52 are released from their adjacent sprocket wheels 47 and 51 so that the shaft 48 may turn without operating the shaft 56 or the eccentrics 41. The crank arm 60 is driven by the shaft 48, however, so as to raise and lower the sucker head
36. The straight line feed chains 83 of course are operated in connection with the operation of the printing and other portions of the machine.

In Figure 1 there is shown a control arm 103 which cooperated with a rod 104 which has a spring pressed finger 105 disposed beneath the endless chain of magazines at a suitable point, such as opposite the end of the printing mechanism. The lower pins 31a being elongated and projecting downwardly for detachably and selectively receiving on their lower ends extensions or strikers 106, such as shown in Figure 5. The arm 105 projects at its free end into the path of the one or more strikers 106 which are used so that the striker as it is carried by the magazine chain swings the arm 105, and through the rod 104 effects a stopping of certain portions of the printing mechanism under control of the arm 103. Of course, the rod 104 may be connected to any suitable mechanism for controlling the different parts of the machine, or for completely stopping the entire mechanism.

It will be noted from Figure 6 that the suction head 36 is provided with an intermediate rib 107 which is convex, or which gradually rises from the opposite end walls of the suction head to an intermediate portion thereof so as, as shown in Figure 5, to eliminate the central portion of the envelope during the suction operation so that the opposite ends of the envelope will be readily withdrawn downwardly from the retaining teeth 34 of the magazine 15. The rib 107 also insures that the opposite ends of the envelope, as the sucker head 36 is moved downwardly, is brought into firm contact with the upper surface portions of the feed chains 83, and beneath the envelope holders 91. The sucker head 33 may be of any desired configuration, and in Figure 6 is shown as comprising not only the longitudinal rib 107, but also as having a plurality of spaced apart transverse ribs 108. Thus, the upper surface of the suction head 36 is divided into a plurality of separate compartments each of which acts on the lower surface portion of the envelope and the envelope is therefore effectively supported against creasing or mutilation under action of the suction pressure, and the envelope is also firmly grasped by the suction head. Of course, the convex rib 107 may be disposed crosswise of the suction head, or at any suitable angle and height desired.

It is obvious that various changes and modifications may be made in the details of construction and design of the above specifically described embodiment of this invention without departing from the spirit thereof, such changes and modifications being restricted only by the scope of the following claims.

What is claimed is:

1. In envelope feed mechanism the combination with an endless magazine carrier adapted to carry stacks of envelopes therein, a straight line feeder disposed in register with a printing mechanism and in a straight line with one run of said magazine carrier, and means operable between said magazine carrier and said straight line feeder for transferring envelopes directly and consecutively from the magazines to the feeder for supplying the envelopes without angular adjustment to the printing machine.

2. In an envelope feed mechanism for a printing machine, an endless magazine carrier in line with the machine and with the magazines disposed thereon with their major axes in parallel relation, said endless carrier having one run disposed in straight line register with the printing machine, a pair of spaced apart feeder chains disposed in straight line register with the printing machine and with said run of magazines and overlapping the end of said run, and a sucker head operable between said feeder chains for upward movement toward said magazines to receive envelopes one at a time therefrom and for downward movement to deposit the envelopes across the spaced feeder chains to feed the envelopes in a straight line into said printing machine.

3. In an envelope feeding mechanism for a printing machine, a plurality of magazines having a cross sectional configuration corresponding to the contour of an envelope, means for detachably hinging said magazines together into an endless chain structure, said endless chain having one run disposed in straight line register with the printing machine, a frame for supporting the endless chain structure, and means mounted in the frame for expanding and contracting the same to accommodate adjustments in the endless chain structure by the removal of magazines therefrom and the addition of magazines thereto.

4. In an envelope handling machine, a magazine adapted to support a stack of envelopes and being open at its lower end, a suction head, means for operating the suction head toward and from the bottom of the magazine for withdrawing the envelopes one at a time from the magazine, said suction head having an intermediate upstanding rib with a convex edge portion adapted to engage the under side of the envelope for bulging the intermediate portion of the envelope upwardly during the operation of the suction head and facilitate the release of the edge portions of the envelope from the magazine.

5. In an envelope handling machine, a magazine for stacking the envelopes, a sucker head operable beneath the magazine to withdraw the envelopes one at a time therefrom, a feeder arranged with its inner end beneath the magazine and having a pair of spaced apart feed chains therein, said sucker head adapted to deliver the envelopes upon said chains, fingers arranged upon said chains for engagement with the envelopes to carry the same forwardly in the feeder, a pair of envelope holders movably mounted on the feeder, operating means between the envelope holders and said sucker head for opening said holders when said sucker head is raised to receive an envelope and adapted to close said holders when said sucker head is lowered to clamp the holders on the envelope and retain the same on said chains.

6. In an envelope handling machine, a magazine for envelopes, a pair of lugs on the inner end of the magazine, links for the lugs, pivot pins connecting the lugs to the links, U-shape clips adapted for slidable engagement at their opposite ends through the end portions of said pivot pins to hold the same through the lugs and links, a spring clip for each U-shape clip having curved ends adapted for yieldable engagement about the outer sides of said pivot pins to hold the clips in superposed relation and retain the U-shape clips through the pins.

7. In an envelope handling machine, an endless row of magazines, drive means, releasable means connecting the drive means to said endless row of magazines, a sucker head, eccentric means for moving the sucker head back and forth to intermittently move with the magazines when operated, a releasable connection between the eccentric means and said drive means for optionally operating the eccentric means, and reciprocating means for the sucker head connected to said drive means for operation thereby to move the sucker head toward and from the magazines.

8. In an envelope handling machine, an endless row of magazines, drive means for the magazines, an operating shaft, a releasable connection between the operating shaft and said drive means for advancing the magazines when desired, a sucker head, reciprocating means for the sucker head connected to said operating shaft for moving the sucker head toward and from the magazines, laterally movable means for the sucker head to cause the same to travel with the magazines at times, and releasable means between the operating shaft and said laterally movable means for releasing the sucker head against lateral movement when the magazines are stationary.

9. Means for feeding envelopes into a printing mechanism, comprising an endless chain of magazines for separate stacks of envelopes, said magazines having their major widths at right angles to the endless chain, envelope transfer means for withdrawing the envelopes one at a time from the magazines, and feeding means for positioning directly in line with a printing mechanism for feeding the envelopes thereto without turning the envelopes.

10. Means for feeding envelopes into a printing mechanism, comprising a straight line feeding mechanism adapted to be disposed in a straight line with the printing mechanism, a magazine for envelopes overhanging the feeding mechanism, and means for withdrawing the lowermost envelope from the magazine and depositing it on the feeding mechanism without axially turning the envelope.

11. In envelope feed mechanism for printing presses, means for moving stacks of envelopes in a straight line with the longitudinal axes of the envelopes in parallel relation, a straight line feeder arranged beneath one end of the straight line of stacks of envelopes and adapted to deliver to a printing press, and means for removing the envelopes and depositing the envelopes consecutively on said feeder to deliver the envelopes from the stacks directly into the printing press without axially turning the envelopes.

12. Envelope feeding mechanism for printing presses, comprising an endless magazine carrier adapted to receive independent stacks of envelopes, a straight line feeder arranged beneath one run of the carrier and in line with a printing press, and a reciprocating picker head operable beneath said run of the carrier and through said straight line feeder for withdrawing the envelopes consecutively one at a time from the carrier and depositing the envelopes directly and without axial turning upon the feeder.

13. In an envelope handling machine for printing presses, a magazine for envelopes, a feeder having one end disposed beneath the magazine and comprising a pair of feed chains with pairs of spaced upstanding fingers thereon, a suction head operable beneath the magazine and beneath the inner ends of said chains for withdrawing envelopes from the magazine one at a time and disposing the envelopes across said chains, means for operating said chains to feed the envelopes forwardly from beneath the magazine, spring fingers disposed at the other end of the feeder for engaging the envelopes to support the same in register with the feed rollers of a printing press.

14. Means for feeding envelopes into a printing mechanism comprising an endless chain of magazines for separate stacks of envelopes, envelope transfer means for withdrawing the envelopes one at a time from the magazines, and feeding means for positioning said envelopes directly in line with a printing mechanism and for feeding the same thereto without turning the envelopes.

15. Means for feeding envelopes into a printing machine, comprising a straight line feeding mechanism disposed in a straight line with the printing machine, an endless chain of magazines for envelopes, and means for withdrawing the lowermost envelope from each magazine consecutively and depositing it on the feeding mechanism without axially turning the envelope.

16. In an envelope handling machine, a magazine for stacking the envelopes, a sucker head operable beneath the magazine to withdraw the envelopes one at a time therefrom, a feeder arranged with its inner end beneath the magazine and including a pair of spaced apart feed conveyors, said sucker head adapted to deliver the envelopes upon said conveyors, means carried by said conveyors for engagement with the envelopes, a pair of envelope holders movably mounted on the feeder, operating means between the envelope holders and said sucker head for opening said holders when said sucker head is raised to receive an envelope, and adapted to close said holders when said sucker head is lowered to clamp the holders on the envelopes and retain the same on the conveyors.

17. In an envelope handling machine, a magazine for stacking the envelopes, a sucker head operable beneath the magazine to withdraw the envelopes one at a time therefrom, a feeder arranged with its inner end beneath the magazine and including a pair of spaced apart feed conveyors, said sucker head adapted to deliver the envelopes upon said conveyors, means carried by said conveyors for engagement with the envelopes, guide means, a pair of envelope holders movably mounted on the feeder, operating means between the envelope holders and said sucker head for opening said holders when said sucker head is raised to receive an envelope, and adapted to close said holders when said sucker head is lowered to clamp the holders on the envelopes and retain the same on the conveyors.

WESLEY P. SHOMAKER.